Figure 1:
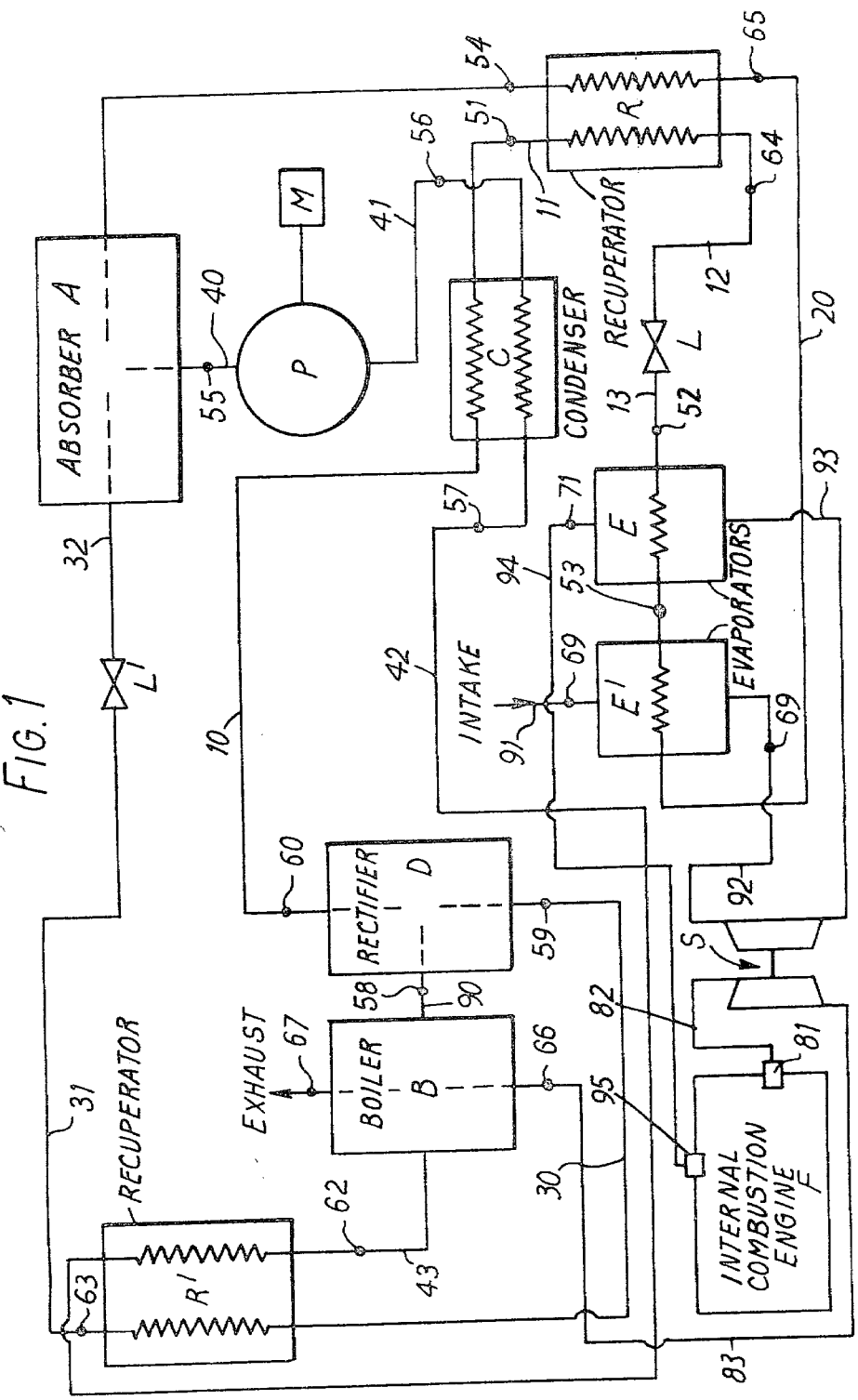

United States Patent [19]

Sampietro

[11] 4,270,365
[45] Jun. 2, 1981

[54] REFRIGERATION APPARATUS

[76] Inventor: Achilles C. Sampietro, P.O. Box 2484, Delray Beach, Fla. 33444

[21] Appl. No.: 60,130

[22] Filed: Jul. 24, 1979

[51] Int. Cl.³ .................... F25B 27/02; B60H 3/04
[52] U.S. Cl. ................................ 62/238.3; 62/239
[58] Field of Search .................. 62/238 B, 239, 495

[56] References Cited

U.S. PATENT DOCUMENTS

| | | | |
|---|---|---|---|
| 2,182,098 | 12/1939 | Sellen | 62/112 X |
| 2,353,966 | 7/1944 | Newcombe . | |
| 2,546,912 | 3/1951 | Sutton | 62/238 B |
| 2,548,508 | 4/1951 | Wolfner . | |
| 2,571,256 | 10/1951 | King . | |
| 2,659,214 | 11/1953 | Coggburn | 62/238 B |
| 2,783,622 | 3/1957 | Bourassa | 62/238 B |
| 3,019,614 | 2/1962 | Schubert et al. | 62/112 X |
| 3,306,032 | 2/1967 | Chaffiotte . | |
| 3,368,367 | 2/1968 | Merrick | 62/495 |
| 4,106,309 | 8/1978 | Phillips | 62/495 X |

*Primary Examiner*—Lloyd L. King
*Attorney, Agent, or Firm*—Blanchard, Flynn, Thiel, Boutell & Tanis

[57] ABSTRACT

Refrigeration apparatus for cooling inlet air for an internal combustion engine uses waste heat from the engine exhaust to heat a mixture of bis(2-methoxyeth oxyethyl)ether and chlorodifluoromethane to drive off the latter component into a flow path extending through a condenser, an expander and evaporators where it removes heat from the inlet air prior to being compressed and returned to be reabsorbed in the mixture in an absorber where heat is rejected. The said flow path includes heat exchanges to improve the thermal efficiency.

13 Claims, 3 Drawing Figures

REFRIGERATION APPARATUS

This invention relates to refrigeration systems and is concerned particularly, but not exclusively, with refrigeration systems for cooling intake air of internal combustion engines.

So-called absorption refrigeration systems employing two fluids which are mutually soluble and of widely differing volatilities are well known. In such systems, vapour of the more volatile fluid is driven-off from a solution of two fluids by heating the solution. The vapour is subsequently condensed and then caused to evaporate in order to produce refrigeration before being recombined with residual less volatile fluid. Systems of this type, employing water and ammonia as the fluids have been used in domestic refrigeration.

It has been proposed in U.S. Pat. No. 2,548,508, (A. S. Wolfner) to employ a system as described above to cool the intake air of an internal combustion engine, the system being powered by heat which would otherwise be lost in the exhaust gases and cooling system of the engine. The system includes a large number of component parts. Moreover, ammonia is employed and this is not now permissible in an automobile for reasons of safety.

It is an object of this invention to provide a refrigeration system employing two mutually soluble fluids, which has few component parts, is suitable for cooling the intake air of an internal combustion engine and is powered by heat which would otherwise be wasted in the exhaust gases of the engine.

It is a further object of this invention to provide a refrigeration system in which a greater amount of refrigeration is produced for a given heat input to the system.

Figure 2:
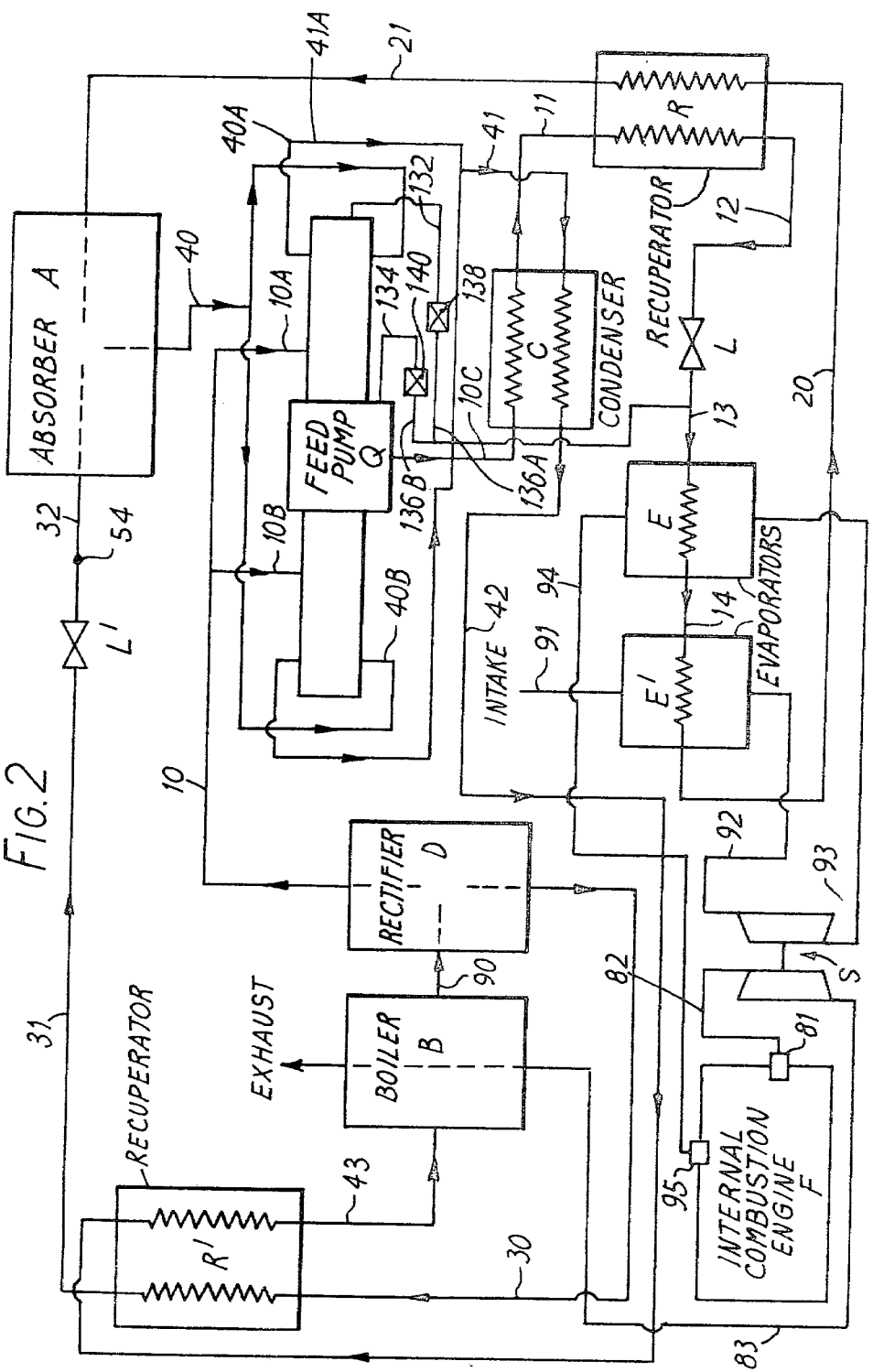
Figure 3:
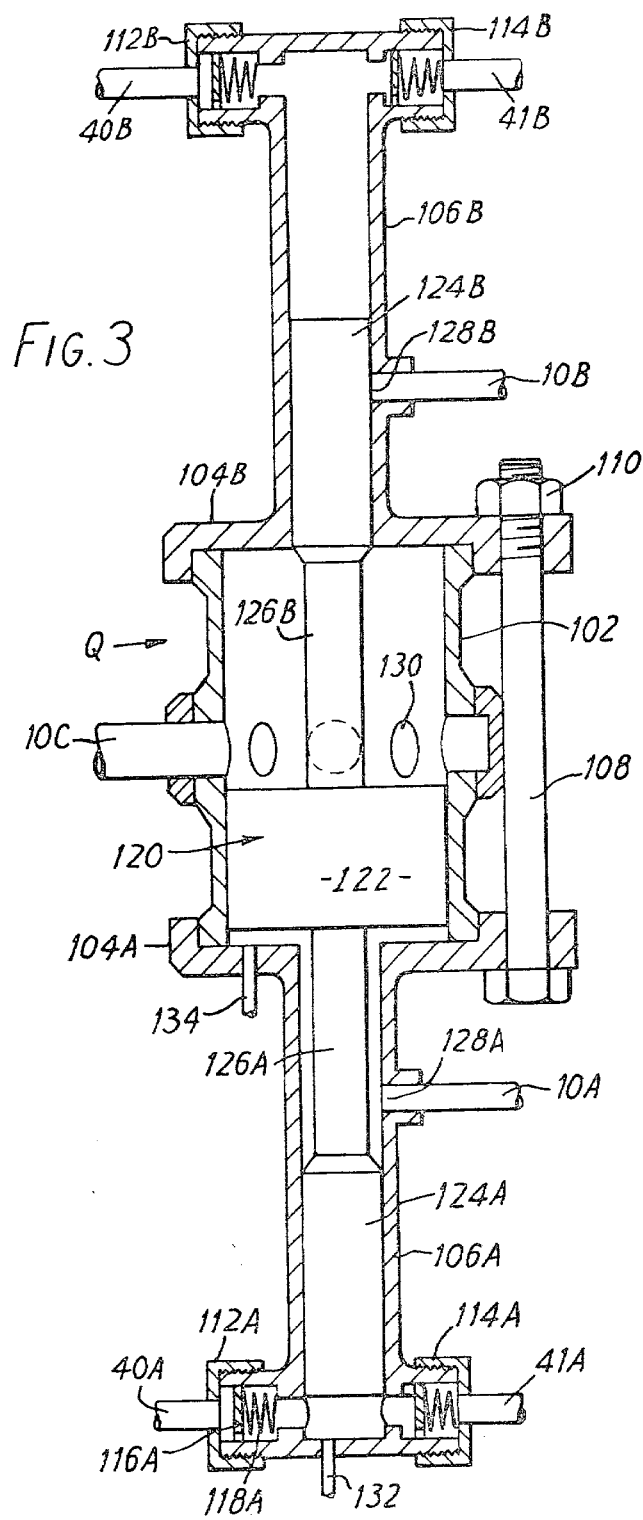

Two embodiments of the invention will now be described by way of example with reference to the accompanying drawings, in which:

FIG. 1 shows a refrigeration system used in conjunction with an internal combustion engine, FIG. 2 shows a refrigeration system, similar to that shown in FIG. 1, incorporating an alternative type of feed pump, and FIG. 3 shows the feed pump of the system shown in FIG. 2.

The refrigeration system shown in FIG. 1 utilises a mixture of bis(2-methoxyethoxyethyl)ether (B.P. 276° C., F.P. −29.7° C., at 1 atm. pressure), hereinafter referred to as DEM-TEG, and chlorodifluromethane (B.P. −40.8° C. F.P. −160° C., at 1 atm. pressure), hereinafter referred to as Freon 22, in a mass ratio of 0.674 to 0.326.

The mixture of fluids is contained in a boiler B. A first exhaust gas duct 82 extends from an exhaust port 81 of an internal combustion engine F, to a turbocharger S from which a second exhaust gas duct 83 extends to the boiler B. A pipe 90 connects the boiler B to a rectifier D in which a stream of Freon 22 vapour may be separated from a residual liquid which is more concentrated in DEM-TEG than the mixture in the boiler. Pipes 10, 11, 12, 13, 14 connect the rectifier D, to, in series, a condenser C, a recuperator R, a first expansion valve L, a first evaporator E and a second evaporator $E^1$, to provide a first fluid path for Freon 22 vapour. Air intake ducts 91, 92 provide a path for intake air through the second evaporator E' to the turbocharger S. Further air intake ducts 93, 94 connect the turbocharger S to an intake port 95 of the engine F through the first evaporator E.

A pipe 20 for Freon 22 connects the second evaporator E' to the recuperator R which is connected to an absorber A by a pipe 21 to provide a second fluid path from the second evaporator $E^1$ to the absorber A. A pipe 30 for residual liquid from the rectifier connects the rectifier D to a second recuperator R'. A pipe 31 connects the second recuperator R to a second expansion valve $L^1$, which is connected to the absorber A by a pipe 32, to provide a third fluid path from the rectifier D to the absorber A. Pipes 40, 41, 42, 43 for the mixture of DEM-TEG and Freon 22 connect the absorber to, in series, a feed pump P, driven by an electric motor M, the condenser C, the second recuperator R' and the boiler B to provide a fourth fluid path from the absorber A to the boiler B. The electric motor M may, in alternative embodiments, be replaced by a direct mechanical connection to the engine F.

Fluid conveyed from the rectifier D by the pipe 10 flows through the condenser C in counterflow heat exchange relationship with fluid pumped thereto through the pipe 41. Fluids conveyed to the first recuperator R by pipes 11, 20 are also in counterflow heat exchange relationship with each other, as are fluids conveyed by pipes 30 and 42 to the second recuperator R'.

Gases conveyed by the first exhaust duct 82 drive the turbocharger S which pumps intake air through the second evaporator E', along the air intake duct 93. The intake air is cooled by but not physically mixed with fluid passing through the evaporators E and E'.

The functioning of the circuit described above will now be described with reference to Table 1 in which the temperatures, pressures and fluid concentrations at points 52 to 71 shown on FIG. 1 are tabulated.

In operation, exhaust gases from the engine F flow from the exhaust port 81 along the first exhaust duct 82 to drive the turbocharger S and thence to the boiler B to heat the mixture of DEM-TEG and Freon 22. A stream of heated mixture passes from the boiler B along the pipe 90 to the rectifier D where Freon 22 vapour at 165° C. is separated to leave the residual liquid.

The Freon 22 vapour passes along the pipe 10 to the condenser C where it is cooled by rejection of heat to the mixture of DEM-TEG and Freon 22 following the fourth path and condenses under a pressure of $2.54 \times 10^6$ Nm$^{-2}$ to a liquid at 65.6° C. The liquid Freon 22 is conveyed by the pipe 11 to the first recuperator R where further cooling of the liquid Freon 22 to 34.1° C. takes place by rejection of heat to Freon 22 following the second path and supplied to the recuperator R by the pipe 20. The first expansion valve L causes a reduction of pressure in the pipe 13 compared with that in the pipe 12. At this reduced pressure the Freon 22 evaporates in the pipes 13, 14 and the first and second evaporators E, E'. Latent heat of vaporisation is absorbed from air pumped by the turbocharger S along the intake air intake ducts 91, 92, 93, 94 through the evaporators E', E. The intake air is cooled from 35° C. to 10° C. by passing through with evaporators E', E.

The pipe 20 conveys Freon 22 from the second evaporator E' to the first recuperator R whence the pipe 21 conveys the Freon 22 to the absorber A. The Freon 22 vapour is heated to 47.9° C. in the first recuperator by acceptance of heat from liquid Freon 22 following the first fluid path.

The pipe 30 conveys residual liquid DEM-TEG and Freon 22 at 165° C., from the rectifier D to the second recuperator R', where cooling to 93.7° C. takes place by rejection of heat to DEM-TEG and Freon 22 following the fourth fluid path. The pipe 31 conveys the residual mixture to the second expansion valve L' whence a pipe 32 conveys the mixture to the absorber A where it combines with Freon 22 conveyed thereto by the pipe 21 to re-form a DEM-TEG and Freon 22 mixture with composition equal to that in the boiler. Heat is rejected to the atmosphere at the absorber A.

The mixture of Freon 22 and DEM-TEG from the absorber A is pumped by the feed pump G through the pipes 40, 41 to the condenser C, through the pipe 42 to the second recuperator R' and through the pipe 43 to the boiler B. Heat accepted in the condenser C and the second recuperator R' raises the temperature of the mixture from 50° to 134° C.

The refrigeration system shown in FIG. 2 is identical with the one shown in FIG. 1 with the exception that the feed pump P and the motor M are replaced by a double-acting free-piston feed pump Q driven by expansion of Freon vapour conveyed by the pipe 10.

Referring now to FIG. 3, the pump Q has a central driving cylinder 102, the two end caps 104A and 104B of which are formed by flanged end portions of first and second pump cylinders 106A and 106B respectively. The two end caps 104A and 104B are held against the two ends of the cylinder 102 (with suitable sealing compounds or gaskets, not shown), by means of a ring of tie-bolts 108 carrying nuts 110.

At its outer end, each pump cylinder 106A and 106B has an inlet valve 112A, 112B and an outlet valve 114A, 114B. Each inlet valve 112 and each outlet valve 114 is a non-return valve having a valve member indicated in the drawing as a disc in the case of the inlet valve 112A, this disc 116A being applied against its seat by a spring 118A.

Mounted within the assembly of cylinders described above is a free-piston assembly 120 which comprises a central large diameter piston 122 slidable in the cylinder 102 and first and second smaller diameter pump pistons 124A and 124B slidable in the respective pump cylinders 106A and 106B and connected to the piston 122 by stems 126A and 126B respectively, each of the stems being of smaller diameter than the pump pistons 124A and 124B.

Pressurized refrigerant vapour to power the driving cylinder of the pump is supplied through pipes 10A, 10B to two inlets 128A and 128B which open in the side walls of the pump cylinders 106A and 106B. The length of each pump piston 124A, 124B is such in relation to the position of the associated inlet 128A, 128B that the pump piston acts as a slide valve and covers or exposes the inlet, in accordance with the position of the piston assembly 120. Thus, in the position shown in FIG. 3, the pump piston 124B closes the inlet 128B while the pump piston 124A exposes the inlet 128A which can therefore deliver Freon 22 vapour from the rectifier D against the lower face of the piston 122. A ring of outlet ports 130 in the centre of the pump cylinder 102 lead to the outlet pipe 10C so that in the position shown in FIG. 3, the space within the pump cylinder above the piston 122 is connected to the outlet pipe 10C. Accordingly, the piston assembly is driven upwards to that the pump piston 124A draws in liquid refrigerant from the pipe 40A through the inlet valve 112A, the outlet valve 114A being closed, while at the same time the pump piston 124B drives liquid refrigerant into the pipe 41B through the outlet valve 114A, the inlet valve 112B being held closed. After a time, the piston 124A closes the inlet 128A and the expanding refrigerant vapour below the piston 122 continues to drive the piston assembly upwards. Next, the outlet ports 130 are closed as the piston 122 moves past them and thereafter the lower edge of the pump piston 124B uncovers the inlet 128B, the inlet 128A remaining closed by the pump piston 124A. With the outlet ports 130 now uncovered by the piston 122, the high pressure refrigerant vapour from the inlet 128B is applied against the upper face of the piston 122 to drive it downwards again to the position shown in FIG. 3, thereby drawing in liquid refrigerant through the inlet valve 112B, the inlet 114B being closed, and to drive liquid refrigerant out into the pipe 41A through the outlet valve 114A, holding the inlet valve 112A closed.

In order to ensure that the piston assembly 120 always returns to an end position (as shown for example in FIG. 3) when the system is shut down the following arrangement is provided. The lower ends of the pump cylinder 106A and the driving cylinder 102 in FIG. 3 are connected by respective dump pipes 132, 134 to respective pump valves 138, 140 (see FIG. 2). When in their closed position the dump valves 138, 140 prevent flow of fluid from the dump pipes 132, 134 to respective branch lines 136A, 136B of a pipe 136 which is connected to the pipe 13 between the first expansion valve L and the first evaporator E.

When the system is shut down, the dump valves 138, 140 are opened and the cylinders 106A, 102 of the pump Q are thus connected to the pipe 13. The pressure in the pipe 13 is much lower than that in the pipe 41 to which the outlet valves 114A, 114B of the pump Q are connected during operation of the system. The high pressure which persists in the pipe 41B for a short while after opening the dump valves 138, 140 acts upon the piston 124B of the pump Q and thus ensures that the piston assembly returns to the end position shown in FIG. 3.

The pump Q shown in FIG. 3 is connected into the circuit shown in FIG. 2 by joining the pipes 10A, 10B, into the pipe 10, connecting the pipe 10C to the condenser C, joining the pipes 40A, 40B into the pipe 40 and joining the pipes 41A, 41B into a pipe 41 which is connected to the condenser C.

TABLE 1

| POINT | FLUID AND COMPOSITION | TEMPERATURE (°C.) | PRESSURE (N m$^{-2}$) | FLOW RATE (kg s$^{-1}$) |
| --- | --- | --- | --- | --- |
| 52 | 9.2% liquid Freon 22, 80.8% Freon 22 vapour | −5.00 | 4.22 × 10$^5$ | 0.109 |
| 53 | 35.8% liquid Freon 22, 64.2% Freon 22 vapour | −5.00 | 4.22 × 10$^5$ | 0.109 |
| 54 | Freon 22 vapour | 47.9 | 4.22 × 10$^5$ | 0.109 |
| 55 | 32.6% liquid Freon 22, 67.4% liquid DEM-TEG | 50.0 | 4.22 × 10$^5$ | 0.813 |
| 56 | 32.6% liquid Freon 22, 67.4% liquid DEM-TEG | 51.2 | 2.54 × 10$^6$ | 0.813 |
| 57 | 32.6% liquid Freon 22, 67.4% liquid DEM-TEG | 69.9 | 2.54 × 10$^6$ | 0.813 |
| 58 | 32.6% liquid Freon 22, 67.4% liquid DEM-TEG | 180 | 2.54 × 10$^6$ | 0.813 |
| 59 | 12.0% liquid Freon 22, 88.0% liquid DEM-TEG | 165 | 2.54 × 10$^6$ | 0.704 |

TABLE 1-continued

| POINT | FLUID AND COMPOSITION | TEMPERATURE (°C.) | PRESSURE (N m$^{-2}$) | FLOW RATE (kg s$^{-1}$) |
|---|---|---|---|---|
| 60 | Freon 22 vapour | 165 | $2.54 \times 10^6$ | 0.109 |
| 61 | Freon 22 liquid | 65.6 | $2.54 \times 10^6$ | 0.109 |
| 62 | 32.6% liquid Freon 22, 67.4% liquid DEM-TEG | 134 | $2.54 \times 10^6$ | 0.813 |
| 63 | 22.0% liquid Freon 22, 88.0% liquid DEM-TEG | 93.7 | $2.54 \times 10^6$ | 0.704 |
| 64 | Freon 22 liquid | 34.1 | $2.54 \times 10^6$ | 0.109 |
| 65 | Freon 22 vapour | −5.00 | $4.22 \times 10^5$ | 0.109 |
| 66 | Exhaust gases (N$_2$, O$_2$, CO$_2$, CO etc) | 500 | $4.22 \times 10^5$ | 0.201 |
| 67 | Exhaust gases (N$_2$, O$_2$, CO$_2$, CO etc) | 228 | $4.22 \times 10^5$ | 0.201 |
| 68 | air (60% humidity) | 35 | $1.01 \times 10^5$ | 0.192 |
| 69 | air (60% humidity) | 10.0 | $1.01 \times 10^5$ | 0.192 |
| 70 | air (60% humidity) | 72.0 | $2.03 \times 10^5$ | 0.192 |
| 71 | air (60% humidity) | 10.0 | $2.03 \times 10^5$ | 0.192 |

I claim:

1. In an automotive vehicle having an internal combustion engine including an air intake duct and an exhaust duct, the improvement which is a refrigeration system comprising first and second fluids, the second fluid being of greater volatility than the first fluid and the natures and relative concentrations of the fluids being such that they are mutually unreactive and mutually soluble, an absorber for combining the two fluids to form a mixture, said absorber being adapted to reject heat to the atmosphere, a boiler in heat-receiving relationship with the exhaust duct for heating the mixture in said boiler, a rectifier connected to said boiler for receiving heated mixture therefrom to separate said heated mixture into a liquid residue and a vapor of the second fluid, an evaporator in said air intake duct, said evaporator being arranged for heat transfer from intake air of said engine to fluid in said evaporator, a first path for conveying the second fluid from the rectifier to the evaporator, a second path for conveying the second fluid from the evaporator to the absorber, a third path for conveying the residue from the rectifier to the absorber and a fourth path for conveying the mixture from the absorber to the boiler, the first path comprising, in series, an expansion stage of a feed pump, said feed pump having a compression stage powered by expansion of fluid in said expansion stage, first cooling means for condensing vapor of the second fluid and first expansion means for expanding the condensed fluid into the evaporator, the first cooling means comprising at least one heat exchanger for rejecting heat to at least one of the second and fourth paths, the third path comprising, in series, second cooling means for rejecting heat from the liquid residue and second expansion means for expanding the liquid residue into the absorber, the second cooling means comprising at least one heat exchanger for rejecting heat to said mixture in the fourth path, the fourth path including said compression stage of said feed pump for pumping mixture in the fourth path from the absorber to the boiler.

2. The apparatus of claim 1, in which the first path comprises third cooling means in series with said first cooling means, said first cooling means comprising a heat exchanger for passing fluid in the first path in counterflow heat-exchange relationship with said mixture in the fourth path and said third cooling means comprising a heat exchanger for passing fluid in the first path in counterflow heat-exchange realtionship with said second fluid in the second path, said second cooling means comprising a heat-exchanger for passing said residue in the third path in counterflow heat-exchange relationship with said mixture in the fourth path.

3. The apparatus of claim 1, having a further evaporator and a pumping means, said further evaporator being arranged for flow of the second fluid between the first and second paths, through said evaporators in series, said further evaporator and said pumping means being arranged in said air intake duct for heat transfer from intake air of the engine to fluid in the evaporators and for flow of intake air through, in series, one of the evaporators, the pumping means and then the other evaporator.

4. The apparatus of claim 3, including a turbocharger having driving and driven turbines, said driving turbine being arranged in the exhaust duct to be powered by exhaust gas of the engine and the pumping means comprising said driven turbine.

5. The apparatus of claim 3, in which said evaporators are arranged for intake air to flow first through the evaporator further from said first expansion means and then through the other evaporator.

6. In an automotive vehicle having an internal combustion engine including an air intake duct and an exhaust duct, the improvement which is a refrigeration system comprising first and second fluids, the second fluid being of greater volatility than the first fluid and the natures and relative concentrations of the fluids being such that they are mutually unreactive and mutually soluble, an absorber for combining the two fluids to form a mixture, said absorber being adapted to reject heat to the atmosphere, a boiler in heat-receiving relationship with the exhaust duct for heating the mixture in said boiler, a rectifier connected to said boiler for receiving heat mixture therefrom to separate said heated mixture into a liquid residue and a vapor of the second fluid, an evaporator in said air intake duct, said evaporator being arranged for heat transfer from intake air of said engine to fluid in said evaporator, a first path for conveying the second fluid from the rectifier to the evaporator, a second path for conveying the second fluid from the evaporator to the absorber, a third path for conveying the residue from the rectifier to the absorber and a fourth path for conveying the mixture from the absorber to the boiler; the first path comprising, in series, first and third heat exchangers for condensing vapor of the second fluid and first expansion means for expanding said condensed vapor of the second fluid into the evaporator, said first heat exchanger being arranged to pass fluid in the first path in counterflow heat-exchange relationship with said mixture in the fourth path and said third heat exchanger being arranged to pass fluid in the first path in counterflow heat-exchange relationship with said fluid in the second path, the third path comprising in series a second heat exchanger for passing said residue in the third path counterflow heat-exchange relationship with said mixture in the fourth path, and second expansion means for expanding said residue into the absorber, the fourth path including a feed pump for pumping mixture from the absorber to the boiler.

7. The apparatus of claim 6, having a further evaporator and a pumping means, said further evaporator being arranged for flow of the second fluid between the first and second paths, through said evaporators in series, said further evaporator and said pumping means being arranged in said air intake duct for heat transfer from intake air of the engine to fluid in the evaporators and for flow of intake air through, in series, one of the evaporators, the pumping means and then the other evaporator.

8. The apparatus of claim 7, including a turbocharger having driving and driven turbines, said driving turbine being arranged in the exhaust duct to be powered by exhaust gas of the engine and the pumping means comprising said driven turbine.

9. The apparatus of claim 7, in which said evaporators are arranged for intake air to flow first through the evaporator further from said first expansion means and then through the other evaporator.

10. A refrigeration system comprising first and second fluids, the second fluid being of greater volatility than the first fluid and the natures and relative concentrations of the fluids being such that they are mutually unreactive and mutually soluble, an absorber for combining the two fluids to form a mixture, said absorber being adapted to reject heat to the atmosphere, a boiler in heat-receiving relationship with a heating means for heating the mixture in said boiler, a rectifier connected to said boiler for receiving heated mixture therefrom to separate said heated mixture into a vapor of the second fluid and a liquid residue, an evaporator, a first path for conveying the second fluid from the rectifier to the evaporator, a second path for conveying the second fluid from the evaporator to the absorber, a third path for conveying the residue from the rectifier to the absorber and a fourth path for conveying the mixture from the absorber to the boiler; the first path comprising, in series, an expansion stage of a feed pump, said feed pump having a compression stage powered by expansion of fluid in said expansion stage, first and third heat exchangers for condensing vapor of the second fluid and first expansion means for expanding said condensed vapor of the second fluid into the evaporator, said first heat exchanger being arranged to pass fluid in the first path in counter-flow heat-exchange relationship with said mixture in the fourth path and said third heat exchanger being arranged to pass fluid in the first path in counterflow heat-exchange relationship with said fluid in the second path, the third path comprising, in series, a second heat exchanger for passing said residue in the third path in counterflow heat-exchange relationship with said mixture in the fourth path, and second expansion means for expanding said residue into the absorber, the fourth path including said compression stage of said feed pump for pumping mixture from the absorber to the boiler.

11. The refrigeration system of claim 10, in which the first fluid is Bis (2-methoxyethoxyethyl) ether and the second fluid is Chloro-difluoromethane.

12. In combination with an internal combustion engine, said engine having an air inlet and an exhaust duct, a refrigeration system comprising first and second fluids, the second fluid being of greater volatility than the first fluid, the nature and relative concentrations of the fluids being such that they are mutually unreactive and mutually soluble, an absorber for combining the two fluids to form a mixture, said absorber being adapted to reject heat to the atmosphere, heating means for heating fluid supplied to a rectifier for separating the supplied fluid into a liquid and a vapor of the second fluid, an evaporator, a first path for conveying fluid vaporized by the rectifier to the evaporator, a second path for conveying fluid from the evaporator to the absorber, a third path for conveying liquid residue from the rectifier to the absorber and a fourth path for conveying the mixture from the absorber to the rectifier, the first path comprising first cooling means for condensing fluid vaporized by the rectifier and first expansion means for expanding the condensed fluids into the evaporator, the first cooling means comprising at least one heat exchanger for rejecting heat to at least one of the second and fourth paths, the third path comprising, in series, second cooling means for rejecting heat from the liquid residue and second expansion means for expanding the liquid residue into the absorber, the second cooling means comprising at least one heat exchanger for rejecting heat to the fourth path, the fourth path including pressurizing means for pumping mixture from the absorber to the rectifier, the evaporator being positioned in the air inlet and the exhaust duct extending through the heating means, pumping means in series with said evaporator for pumping inlet air into the engine, the pumping means comprising a supercharger driven by the engine.

13. A refrigeration system according to claim 12, having first and second said evaporators in series relationship in the first path, the evaporators being positioned in series in the air inlet and having said supercharger positioned therebetween.

* * * * *